United States Patent
Bouchat et al.

(10) Patent No.: US 8,955,034 B2
(45) Date of Patent: Feb. 10, 2015

(54) MODULE AND ASSOCIATED METHOD FOR TR-069 OBJECT MANAGEMENT

(75) Inventors: Christele Bouchat, Antwerp (BE); Pascal Justen, Brussels (BE); Tom Van Leeuwen, Ghent (BE)

(73) Assignee: Alcatel Lucent, Boulogne-Billancourt (FR)

( * ) Notice: Subject to any disclaimer, the term of this patent is extended or adjusted under 35 U.S.C. 154(b) by 710 days.

(21) Appl. No.: 12/591,005

(22) Filed: Nov. 4, 2009

(65) Prior Publication Data

US 2010/0138895 A1 Jun. 3, 2010

(30) Foreign Application Priority Data

Dec. 2, 2008 (EP) .................................. 08291134

(51) Int. Cl.
*H04L 29/06* (2006.01)
*H04L 12/24* (2006.01)
*H04L 12/28* (2006.01)
*H04L 29/08* (2006.01)

(52) U.S. Cl.
CPC ............ *H04L 41/22* (2013.01); *H04L 12/2876* (2013.01); *H04L 41/0213* (2013.01); *H04L 41/145* (2013.01); *H04L 63/102* (2013.01); *H04L 67/125* (2013.01)
USPC ............................................................. 726/1

(58) Field of Classification Search
CPC ... H04W 88/08; H04W 92/12; H04W 76/022; H04W 76/062; H04W 92/20; H04L 41/0213; H04L 67/125; H04L 41/0806; H04L 12/2898; H04L 41/0803
USPC .................................... 726/5, 30, 1
See application file for complete search history.

(56) References Cited

U.S. PATENT DOCUMENTS

| 2008/0216157 A1* | 9/2008 | Huuhtanen et al. ............... 726/4 |
| 2009/0049048 A1* | 2/2009 | Justen et al. ...................... 707/9 |
| 2009/0125524 A1* | 5/2009 | Das et al. ........................ 707/10 |

FOREIGN PATENT DOCUMENTS

EP 2 026 594 2/2009

OTHER PUBLICATIONS

Nikolaidis et al., "Automating Remote Configuration Mechanisms for Home Devices", May 2006, IEEE Transactions on Consume Electronics, pp. 407-413.*
Royon et al., "Virtualization of Service Gateways in multi-provider Environments", 2006, Proceedings of the 9th International SIGSOFT Symposium on Component-Based Software Engineering (CBSE'2006) 4063 (2006) 385-392 DOI: 10.1007/11783565_31, pp. 1-13.*
"ETSI TR 185 007 v2.0.0", Mar. 2008.
"ETSI TS 183 065 v2.0.0", Feb. 2008.
"CPE WAN Management Protocol V1.1", Dec. 2008.

* cited by examiner

*Primary Examiner* — Joseph P Hirl
*Assistant Examiner* — John B King
(74) *Attorney, Agent, or Firm* — Harness, Dickey & Pierce

(57) ABSTRACT

The present invention relates to a security module for use in management of a TR-069 Object Model of a device. The Object Model comprises a plurality of parameters for selection by a view selector module based on credentials and for defining thereby an object model view associated to the device. The security module comprises means for associating the object model view to a security policy and means for configuring the security attributes of the security policy on an intermediate network entity.

9 Claims, 1 Drawing Sheet

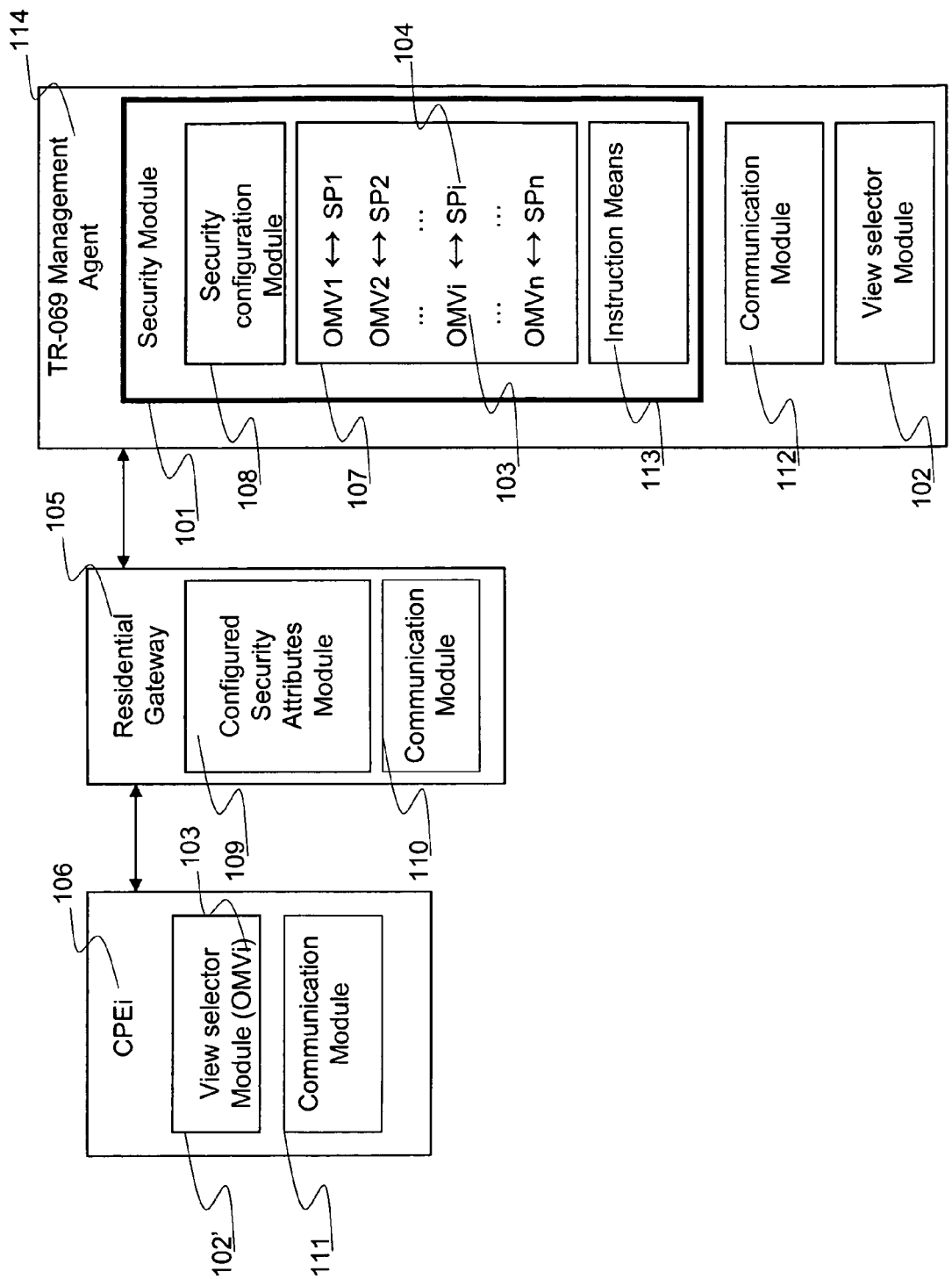

MODULE AND ASSOCIATED METHOD FOR TR-069 OBJECT MANAGEMENT

BACKGROUND

The present invention relates to remote management, i.e. installation, configuration and removal, of application or service software modules—the so called "bundles" on customer premises equipment CPE from a server locate anywhere in the network with connectivity to the CPE devices. The server is named the auto configuration server or remote management server throughout this application. Examples of CPE or customer devices are a digital subscriber Line (DSL) modem, a Set-Top Box (STB), a wireless terminal such as a mobile telephone, a Personal Digital Assistant (PDA), etc. In the context of the present application, a customer device can also be a device residing in the network whereon remote management services are installed for instance a DSLAM, a remote unit (RU), a service blade, etc. More particularly, the invention relates to management of a subset of parameters which belong to a particular service or operator.

A home network connected to a broadband access network such as a Digital Subscriber Line (xDSL) network contains Customer Premises Equipment such as an xDSL modem connected on one side to one or more appliances in the home network and on the other side to a node of the xDSL service provider such as a Digital Subscriber Line Access Multiplexer DSLAM or a traffic aggregation node in a Central Office. The link between this CPE and the DSLAM is used to transport information, which requires the establishment of a communication session between this CPE and the DSLAM. Establishing a communication session typically involves steps such as synchronization between devices, defining error correction systems, determining transmission speed, etc. To achieve this, the modem needs information related to those steps. For instance, it needs to know which error correction codes are available, which speeds can be used, which encodings are preferred, etc.

Furthermore, a TR-069 management protocol is typically used for remote device management. This protocol enables a CPE to be configured from within the service provider network by a remote management server or an Auto-Configuration Server ACS. Such TR-069 Management Protocol is based on an Object Model which is stored in each CPE. The Object Model is made up out of a number of parameters which can be read or altered by remote procedure calls. These parameters are organized in a tree-like structure in the Object Model. As a result of the tree model, a parameter can be addressed explicitly or a subset of parameters can be addressed. The ACS can invoke a remote procedure call RPC to retrieve the value of one or more parameters using an addressing of that particular parameter or subset as described above. The ACS can also invoke an RPC to alter the value of a parameter or subset of parameters. Furthermore, the ACS is able to invoke RPCs which trigger updates of the software on the CPE, installation or removal of software on the CPE, etc. Thus, the TR-069 management protocol enables an operator to remotely configure and manage a CPE which means that a user can access one or more services with little effort.

The TR-069 protocol is also used to remotely manage other CPE's which are more service specific or which offer various services such as e.g. Open Service Gateway initiative OSGi service platforms. However, by using such OSGi, the services and applications share everything on the CPE. This means that the entire TR-069 Object Model is available to the services and applications deployed on the CPE and can be retrieved or altered by any of them. Hereby, each remote management server or ACS is able to modify the TR-069 Object Model and all the parameters stored therein. This means that on a CPE with multiple services running thereon which are related to various service providers, each service provider is able to modify the services and applications of the other operators. Indeed, because the Object Model is a single accessible set of data, service operators are able to gain an advantage over other operators simply by modification of the parameters related to the other operator's services or applications.

In order to avoid malicious use of automatic configuration in a TR-069 Object Model and to provide a more secure set of parameters for each service provider a secure set of parameters is provided automatically by means of a view selector module for use in management of a TR-069 Object Model. Such module typically comprises means for selecting and/or altering one or more of the plurality of parameters based on credentials. The view selector module is described in the European Patent Application filed at 14 Aug. 2007 with application number 07291009.4. Herein it is described that by allowing the selection of parameters or the altering of parameters based upon credentials, it becomes possible to make only a subset of the TR-069 Object Model available to a particular party such as a service provider, remote management server or ACS. This means that the particular party is only able to retrieve information from specific TR-069 parameters such as those for applications or bundles installed by that party or parameters available to everyone or all applications or bundles. Similarly, only a number of parameters can be altered by a specific party whereas other parameters cannot be changed for instance because they do not belong to the party, bundle or service. Thus, it becomes impossible for operator A to view and/or modify parameters related to services of operator B. As such, operator A can no longer gain an unfair advantage for his services over operator B by reducing the capacity or quality of operator B's service.

Furthermore, TR-069 compliant Consumer Premises Devices CPEs in a home network typically use a Transport Layer Security/Secure Sockets Layer, shortly called TLS/SSL session, in cooperation with the Auto Configuration Server ACS in the operator's network for the management of their TR-069 object model parameters. Typically, the ACS or a proxy terminates this TLS/SSL session and manages the object model parameters of the CPE by itself.

It has to be explained that there are several drawbacks to this approach:

1. The knowledge on the configuration of the CPE is maintained at the ACS (or its delegates) in the network of the operator, while the information may be needed locally in the home network as well, e.g. for diagnostics tools; and 2. The TLS/SSL protocol requires quite high storage capacity and CPU power to maintain state for each session on the end-points of the tunnel; and 3. Due to the use of a TLS/SSL session, the information passing through this secure tunnel is transparent to intermediate network devices. With transparent it is meant that passing information can not be read or it can not be interpreted by other intermediate network devices between the CPE and the ACS such as e.g. the residential home gateway.

SUMMARY

It is an object of the present invention to delegate management of the object model to other trusted entities in the operator network i.e. delegates to whom the ACS transfers the management and that are trusted to control partially or entirely the TR-069 object model of the CPE. It is another objective of the present application to share for e.g. low cost residential home gateways, the required quite high storage capacity and CPU power to maintain state for each session on the end-points of the tunnel of the TLS/SSL protocol. It is another objective to provide a management of a TR-069 Object Model which is not transparent to intermediate trusted network devices between the CPE and the ACS i.e. intermediate trusted network devices are enabled to intervene.

According to the present invention the drawbacks of the prior art are overcome and the objectives of the present invention are realized by a security module for use in a management of a TR-069 Object Model of a device, the Object Model comprising a plurality of parameters for selection by a view selector module based on credentials and for defining thereby an object model view associated to the device, and the security module comprising means for associating the object model view to a security policy and means for configuring the security attributes of the security policy on an intermediate network entity.

Indeed, instead of using TLS/SSL session layer security for TR-069 CPE management, a new security method, associated to the TR-069 object model view encryption, is used for the TR-069 management session between the CPE and the ACS. A security policy is assigned to each separate view of the TR-069 CPE object model and related security attributes are configured on a trusted intermediate network entity. Hereby, only those network entities, that possess the right security attributes corresponding to the respective security policy, are able to control a particular view of the TR-069 object model. By distributing the appropriate security policies, the management of the TR-069 CPE device can be delegated by the operator to a selected set of network entities on the TR-069 control path between the CPE and the ACS. As such it relieves the management task of a central ACS and makes the configuration information of the CPE available to other (semi-) trusted applications residing on those intermediate network entities.

Optionally, the means for associating is adapted to be installed on a Remote Management Server, TR-069 Management agent, or ACS.

Each parameter of the TR-069 CPE object model is assigned to a certain object model view with a security policy, whose attributes include a specific encrypt and decrypt key and eventually enforce read-only or write access on individual parameter base. This assignment can be performed by the ACS, using an initial standard TR-069 SSL/TLS configuration session. This initial configuration results in the use of the new security protocol for the subsequent TR-069 communication sessions. After the initial configuration, the ACS deploys certain security policies on a selected set of network devices on the path between the ACS and the CPE e.g. the residential gateway. The attributes of these policies, in particular the en-/decrypt keys, allow these devices to control the associated CPE object model view: these devices are only able to decrypt the parameters of the CPE object model view and their values for which they have the necessary security policy. Likewise, for changing the values of the parameters of their CPE object model view, these intermediate devices need the right encryption key associated with the object model view's security policy. In this way only those network devices that have obtained the right security policy from the ACS are able to access a certain view of the CPE's object model: other object model views are not accessible for these devices.

Furthermore, although TLS/SSL tunnel is not used for layer security for TR-069 CPE management itself, this TLS/SSL protocol might still be used for configuration of the respective security attributes by the ACS upon the intermediate network entity. This means that the features of the TLS/SSL protocol such as e.g. certificates, encryption, etc. are used during configuration of the respective security attributes. It has to be remarked that although the use of TLS/SSL protocol is mentioned as convenient, the device and method of the present application are not limited to this.

Furthermore, the security module further comprises means for communicating with the device and with the intermediate network entity by means of an encryption protocol which is based upon the configured security attributes and to allow thereby the intermediate network entity to control the associated object model view of the device by means of the encryption protocol based upon the configured security attributes.

Optionally, the encryption protocol is implemented by means of a Simple Object Access Protocol SOAP with a body part comprising encrypted TR-069 Object Model messages and a header part comprising an unencrypted reference to the respective security policy. Indeed, the encryption protocol itself can be implemented on the SOAP level, where the SOAP body part contains an encrypted TR-069 message and an unencrypted SOAP header, which indicates what security policy, is required to decrypt the content. By reading the unencrypted SOAP header, the intermediate network entity can decide whether it is able to handle the message itself or needs to forward it towards the ACS. If it possesses the right security policy and decides to answer the message itself, the intermediate device decrypts the TR-069 message and encrypts its response using the encryption key from the corresponding security context. Acting as the ACS, this intermediate device sends its TR-069 encrypted response to the CPE. From the point of view of the CPE, this message appears as if it was sent by the ACS and as such, this protocol hides the delegation of TR-069 object model management for the CPE.

It has to be explained that SOAP, originally defined as Simple Object Access Protocol, is a protocol specification for exchanging structured information in the implementation of Web Services in computer networks. It relies on Extensible Markup Language XML as its message format and usually relies on other Application Layer protocols, most notably Remote Procedure Call RPC and HTTP for message negotiation and transmission. SOAP forms the foundation layer of the web services protocol stack providing a basic messaging framework upon which abstract layers can be built.

Optionally, the intermediate network entity is implemented by a Residential Gateway and that the device is implemented by means of a customer premises equipment. Finally, the module can be adapted to be integrated into the TR069 Management Protocol.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

BRIEF DESCRIPTION OF THE DRAWINGS

The above and other objects and features of the invention will become more apparent and the invention itself will be best understood by referring to the following description of an embodiment taken in conjunction with the accompanying drawings wherein FIG. 1 represents the security module installed in a home access network.

DETAILED DESCRIPTION OF EXAMPLE EMBODIMENTS

The working of the device according to the present invention in accordance with its telecommunication environment that is shown in FIG. 1 will be explained by means of a functional description of the different blocks shown therein. Based on this description, the practical implementation of the blocks will be obvious to a person skilled in the art and will therefor not be described in details. In addition, the principle working of the security method for use in management of a TR-069 Object Model device will be described in further detail.

FIG. 1 illustrates an access home network with a TR-069 Management Agent 114 on an Auto-configuration Server ACS that is coupled to an intermediate network entity i.e. a Residential Gateway 105 which is on its turn coupled to a device being a Customer Premises Equipment 106.

The Management Agent TR-069 114 comprises a Security Module 101 which on its turn comprises means for configuring i.e. a Security configuration module 108, means for associating 107 and a means for instructing 113 a communicating means i.e. a communication module 112. Furthermore, the Management Agent TR-069 114 comprises a View selector module 102 and the communication module 112.

The Customer Premises Equipment 106 comprises a view selector module 102' to be applied upon its parameters and a communication module 111.

The Residential Gateway 105 comprises on its turn a configured security attributes module 109 and a communication module 110.

It has to be explained that a number of parameters of the Customer Premises Equipment object model are selected by a View Selector Module. This selection results into a certain object model view OMVi which is associated to this CPEi. The Customer Premises Equipment 106 in the home network communicates with the TR-069 Management Agent 114 of the Auto-Configuration Server in the operators' network for the management of its TR-069 object model parameters. The Management Agent 114 manages and controls the object model parameters of the Customer Premises Equipment CPEi.

According to the present basic idea, the generated Object Model View OMVi is associated to a certain security policy SPi. The certain security policy SPi defines attributes that include a specific encrypt and decrypt key. The association of the Object Model View OMVi to a certain security policy SPi is performed by the means for associating 107 of the Security Module 101 at the Management Agent 114.

Based upon the association, the attributes of the security policy SPi are configured by the security configuration module of the security module on the residential gateway i.e. the attributes are forwarded to and stored by the security configuration module 108 of the security module 101 on the configured security attributes module 109 of the Residential Gateway 106. It has to be remarked that the assignment can be performed by the security module 101 by using an initial standard TR-069 SSL/TLS configuration session.

After initial configuration of the configured security attributes module at the Residential Gateway 106, subsequent TR-069 communication sessions can take off. The communication module 112 of the TR-069 Management Agent 114 communicates with the similar communication modules, respectively, 111 and 110, of the CPEi device 106 and Residential Gateway 105 by means of an encryption protocol. According to the present application, this encryption protocol is based upon the configured security attributes and allows hereby the intermediate Residential Gateway 105 to control, instead of the TR-069 Management Agent 114, the associated object model view OMVi 103 of the device 106 by means of this encryption protocol which is based upon the configured security attributes.

The TR-069 Management Agent deploys certain security policies on network elements on the path between the TR-069 Management Agent and the CPE such as e.g. the Residential Gateway 106. The attributes of these policies, in particular the en-/decrypt keys, allows the intermediate network entity to control the associated CPE object model view. Indeed, the intermediate network entity is enabled to decrypt the parameters of the CPE object model view and their values, only for which it received the necessary security policy. Likewise, for changing the values of the parameters of their CPE object model view, the intermediate network entity needs the right encryption key associated with the object model view's security policy. In this way only those network devices that have obtained the right security policy from the ACS are able to access a certain view of the CPE's object model, but other object model views are not accessible for these devices.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A security module for use in management of a TR-069 Object Model of a device, the security module comprising:
   a means for associating an object model view of the device to a security policy; and
   a means for configuring security attributes of the security policy on an intermediate network entity of an end user such that at least partial management of the device switches from a TR-069 management agent to the intermediate network entity, the security attributes including an encrypt and decrypt key unique to the device, the TR-069 management agent of the device including a first view selector module configured to select a plurality of parameters based on credentials, the device including a second view selector module configured to select the object model view using the plurality of parameters, the plurality of parameters defining the object model view associated with the device.

2. The security module for use in management of a TR-069 Object Model of a device according to claim 1, wherein said means for associating is installed on a Remote Management Server.

3. The security module for use in management of TR-069 Object Model of a device according to claim 1, wherein said security module uses a Transport Layer Security/Secure Sockets Layer protocol for configuring said security attributes on said intermediate network entity.

4. The security module for use in management of a TR-069 Object Model of a device according to claim 1, wherein said security module further comprises an instruction means for communicating with said device and with said intermediate network entity using an encryption protocol which is based upon said configured security attributes and allows said intermediate network entity to control said associated object model view of said device.

5. The security module for use in management of a TR-069 Object Model of a device of claim 4, wherein said encryption protocol is implemented by a Simple Object Access Protocol with a body part comprising encrypted TR-069 Object Model messages and a header part comprising an unencrypted reference to said security policy.

6. The security module for use in management of TR-069 Object Model of a device according to claim 1, wherein said intermediate network entity is implemented by a Residential Gateway.

7. The security module for use in management of a TR-069 Object Model of a device according to claim 1, wherein said device is a customer premises equipment.

8. The security module for use in management of TR-069 Object Model of a device according to claim 1, wherein said module is integrated into a TR069 Management Protocol.

9. A security method for use in management of a TR-069 Object Model of a device, the method comprising:

associating an object model view of the device to a security policy;

configuring security attributes of said security policy on an intermediate network entity of an end user such that at least partial management of the device switches from a TR-069 management agent to the intermediate network entity, the security attributes including an encrypt and decrypt key unique to the device;

selecting, by a first view selector module, a plurality of parameters based on credentials, the plurality of parameters defining the object model view associated to the device; and selecting, by a second view selector module, the object model view using the plurality of parameters.

* * * * *